United States Patent [19]

Yoshida et al.

[11] Patent Number: 5,231,433

[45] Date of Patent: Jul. 27, 1993

[54] REFLECTING ILLUMINATION PROJECTING DEVICE

[75] Inventors: Kazushi Yoshida; Ryota Ogawa, both of Tokyo, Japan

[73] Assignee: Asahi Kogaku Kogyo Kabushiki Kaisha, Tokyo, Japan

[21] Appl. No.: 642,234

[22] Filed: Jan. 16, 1991

[30] Foreign Application Priority Data

Jan. 19, 1990 [JP] Japan .................................. 2-11658

[51] Int. Cl.⁵ .............................................. G03B 21/28
[52] U.S. Cl. ........................................ 353/63; 353/64; 353/37; 353/DIG. 4
[58] Field of Search .................... 353/64, 63, 98, 99, 353/DIG. 3, DIG. 4, 31, 37, 65, 66; 359/38, 70, 71

[56] References Cited

U.S. PATENT DOCUMENTS

| | | | |
|---|---|---|---|
| 3,486,817 | 12/1961 | Hubner | 353/64 |
| 3,525,566 | 8/1970 | Altman | 353/38 |
| 4,111,538 | 9/1978 | Sheridon | 353/99 |
| 4,986,651 | 1/1991 | Vanderwerf | 353/DIG. 4 |
| 5,024,524 | 6/1991 | Flasck | 353/31 |

FOREIGN PATENT DOCUMENTS 62-115120  5/1987  Japan .................................. 353/98

Primary Examiner—William A. Cuchlinkski, Jr.
Assistant Examiner—William C. Dowling
Attorney, Agent, or Firm—Sandler Greenblum & Bernstein

[57] ABSTRACT

A reflecting illumination projecting device includes a light source which emits illuminating light and a mirror which reflects the illuminating light emitted from the light source. A transmission type image forming portion is provided between the light source and the mirror to form a pattern to be projected, and a projecting lens is provided between the light source and the image forming portion. An optical path separating element is disposed in the vicinity of an exit pupil of the projecting lens. The optical path separating element includes a first portion for introducing substantially all of the illuminating light to the projecting lens and a second portion for introducing light reflected by the mirror onto the image projection plane.

15 Claims, 20 Drawing Sheets

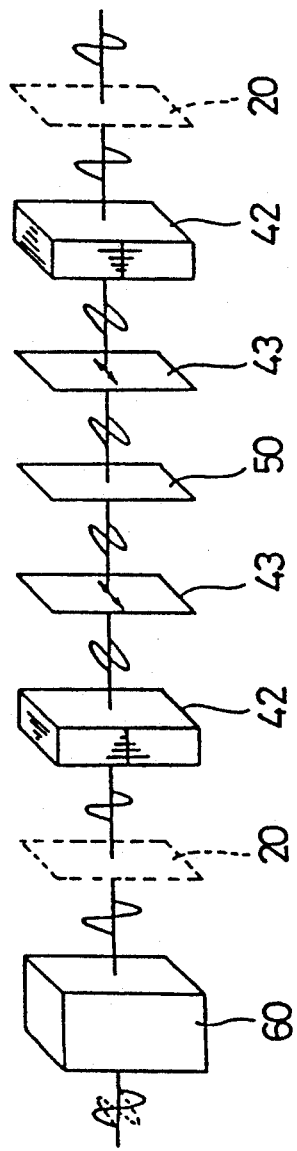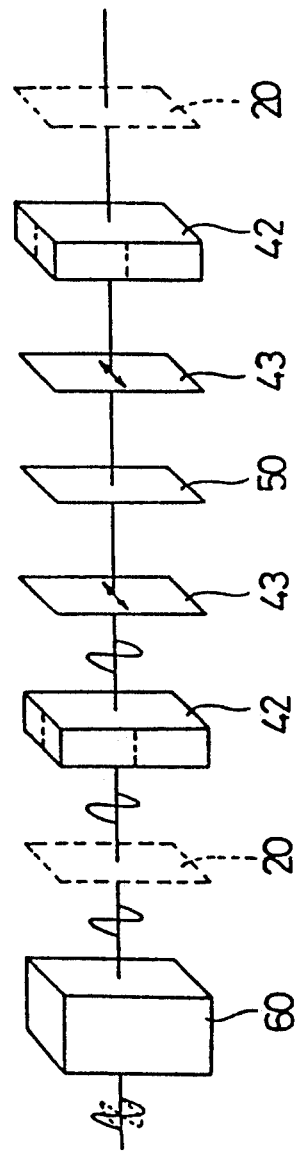

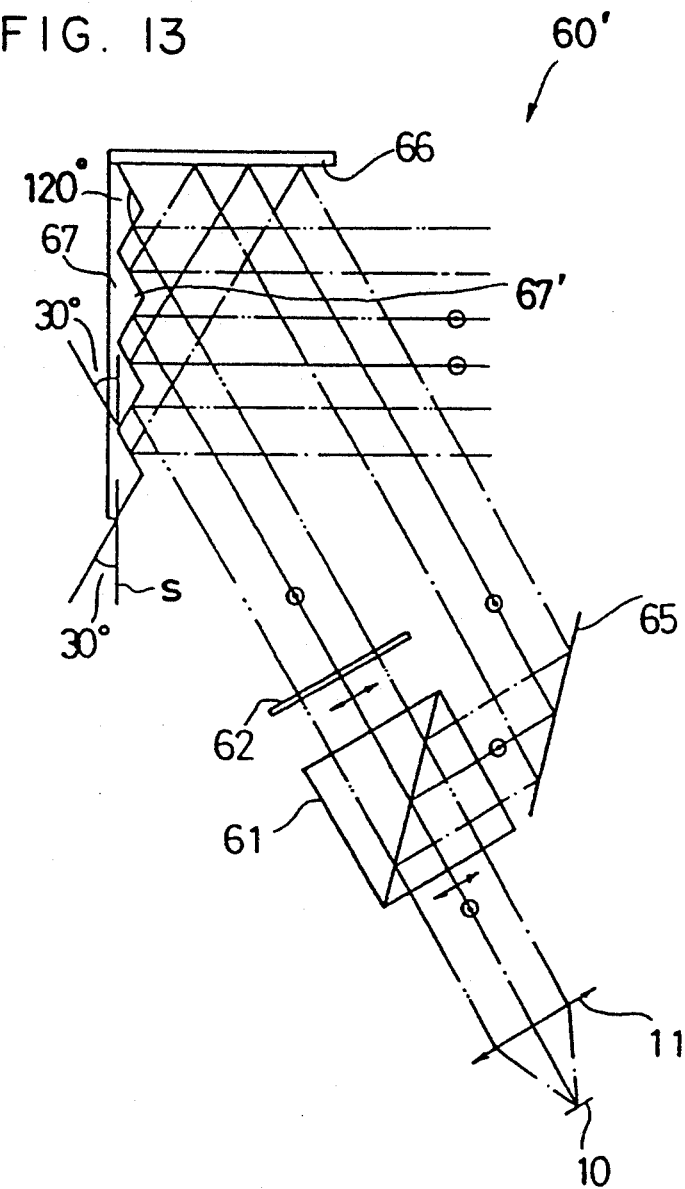

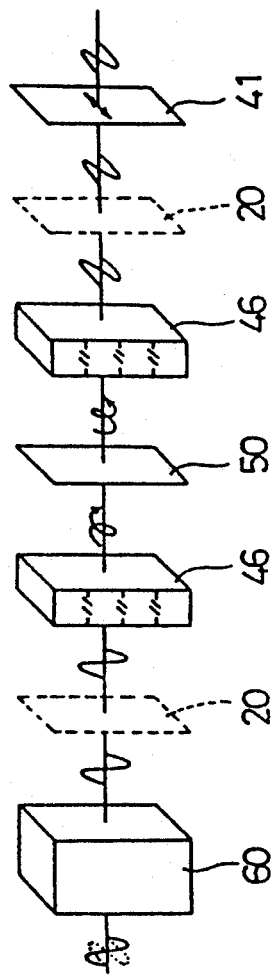
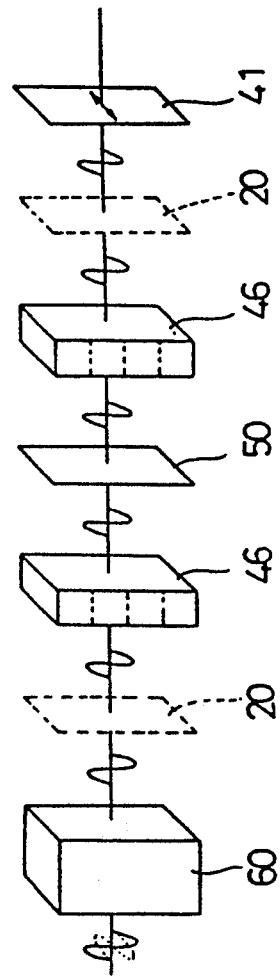

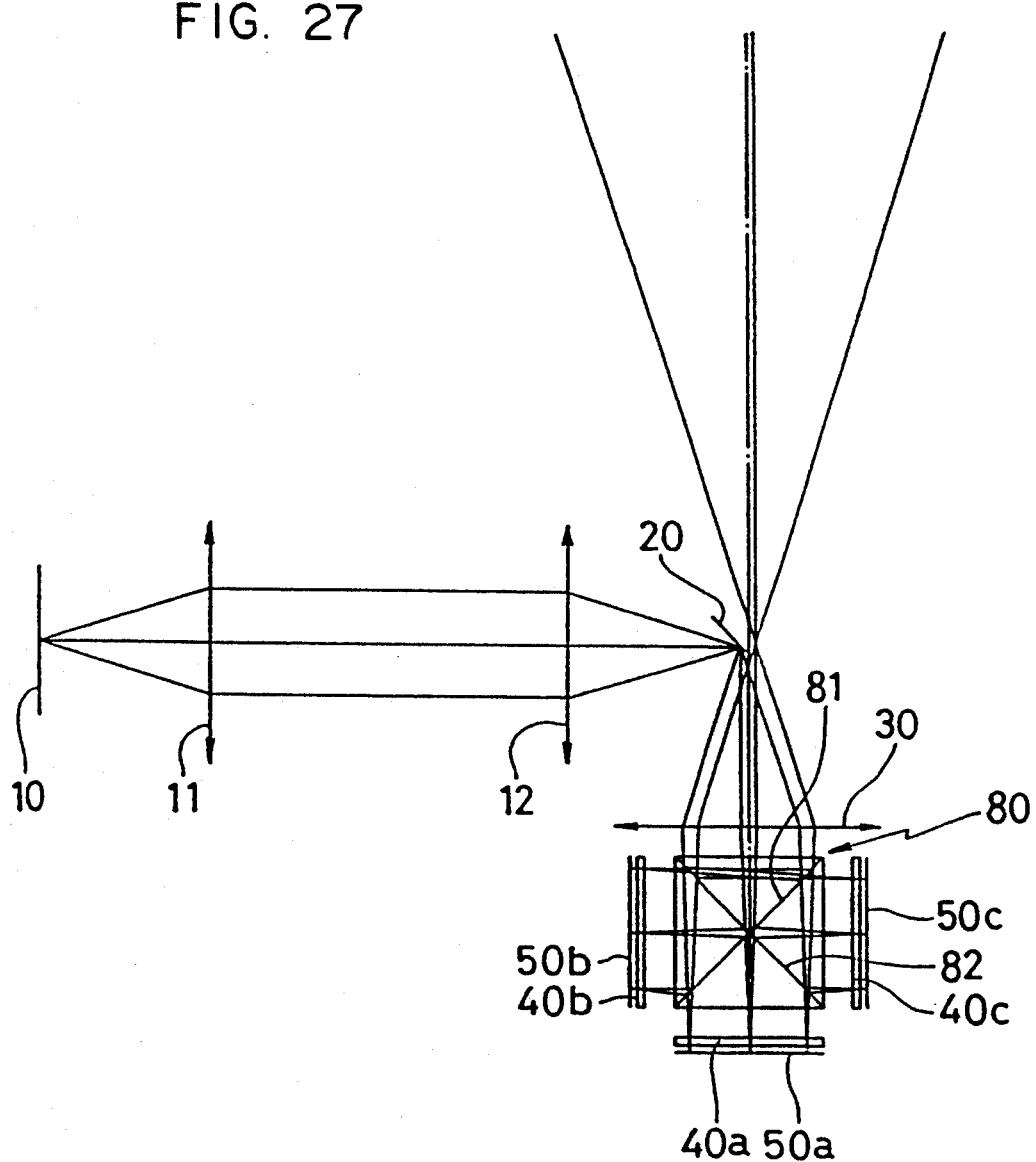

REFLECTING ILLUMINATION PROJECTING DEVICE

BACKGROUND OF THE INVENTION

1. Field of the Invention

The present invention relates to a reflecting illumination projecting device which projects a pattern formed on a transmission image forming device onto a screen or a photosensitive member with a reflecting illumination. More precisely, the present invention relates to a reflecting illumination projecting device which can be advantageously used with a liquid crystal display as an image forming device.

This application is related to the commonly assigned application U.S. Ser. No. 07/383,079, the disclosure of which is expressly incorporated by reference herein.

2. Description of the Related Art

FIG. 28 shows a known reflecting illumination type projecting device in which a liquid crystal display is used as an image forming device. A light flux emitted from a light source 1 is collimated by a illuminating lens 2 and is then partly reflected by a half mirror 3 toward the image forming unit 9. The image forming unit 9 includes two polarizing plates 4 and 6 having orthogonal transmission axes and a liquid crystal cell 5 disposed between the polarizing plates 4 and 6.

When natural light including all polarization directions is made incident upon the polarizing plates 4 and 6, only predetermined directions of polarized light can be transmitted therethrough, as is well known.

The light flux transmitted through the image forming unit 9 is reflected by a mirror 7 and is then transmitted again through the image forming unit 9 and the half mirror 3 to be projected onto a screen (not shown).

The liquid crystal cell 5 is made of 90° twisted nematic crystals and is electrically turned ON and OFF to selectively permit the natural light incident thereupon to pass therethrough in cooperation with the polarizing plates 4 and 6.

FIG. 29 shows an inoperative position of the optical system shown in FIG. 28 in which the liquid crystal cell 5 is turned OFF (i.e., no voltage is applied to the liquid crystal cell).

In FIG. 29, a natural light beam emitted from the light source is reflected by the half mirror 3, so that one half of the quantity of the light beam is made incident upon the polarizing plate 4. Only a predetermined direction of linear polarized beam is transmitted through the polarizing plate 4, so that the quantity of the beam is further reduced by half. Since the direction of the linear polarization is rotated by 90° when transmitted through the liquid crystal cell 5, the linear polarization transmitted through the liquid crystal cell 5 directly passes through the polarizing plate 6 and is reflected by the mirror 7. As a result, the reflected beam is returned through the polarizing plate 6, the liquid crystal cell 5 and the polarizing plate 4 to the half mirror 3 along the same optical path as the going optical path. On the return, the direction of the polarized beam is turned again by 90° by the liquid crystal cell 5, so that the polarized beam is transmitted through the polarizing plate 4. When the beam passes through the half mirror 3 to reach the screen, the quantity thereof is reduced by half. Consequently, only one eighth of the light flux emitted from the light source can reach the screen.

When the power source of the liquid crystal cell 5 is activated, that is, when the voltage is applied to the liquid crystal cell 5, the linear polarization of beam transmitted through the polarizing plate 4 directly passes through the liquid crystal cell 5 without turning the direction of polarization. Accordingly, the polarization direction of the linear polarized beam is perpendicular to the transmission axis of the polarizing plate 6, so that the beam is intercepted by the polarizing plate 6, as shown in FIG. 30.

As can be seen from the foregoing, in a conventional optical system in which the half mirror is used to introduce the illuminating light beam to the image forming device (image forming unit), only 25% of the light flux emitted from the light source at the maximum can be effectively used to project an image. Furthermore, in a known optical arrangement in which the liquid crystal cell is held between the two polarizing plates, a further decrease in quantity of light by half takes place. Consequently, it is impossible to enhance the contrast of an image on the screen.

SUMMARY OF THE INVENTION

The primary object of the present invention is to provide a reflecting illumination projecting device in which the quantity of light which can be effectively used to project an image can be increased by eliminating the drawbacks as mentioned above.

To achieve the object mentioned above, according to the present invention, there is provided a reflecting illumination projecting device comprising a light source which emits illuminating light, a mirror which reflects the illuminating light emitted from the light source, a transmission type image forming portion which is provided between the light source and the mirror to form a pattern to be projected, a projecting lens which is provided between the light source and the image forming portion, and an optical path separating device disposed in the vicinity of an exit pupil of the projecting lens. The optical path separating device includes a first portion for introducing substantially all illuminating light to the projecting lens and a second portion for introducing reflected light by the mirror onto the image projection plane.

With this optical arrangement, no reduction in quantity of light at the optical path separating device occurs.

In the aspect of the present invention, an optical axis of illuminating light from the light source crosses to the optical axis of the projecting lens in the vicinity of the exit pupil of the projecting lens. The first portion of the optical path separating device can be, for example, a total reflecting mirror disposed on one side of a diameter of the projecting lens, which mirror reflects the illuminating light from the light source towards the projecting lens.

Preferably, the optical axis of illuminating light from the light source is normal to the optical axis of the projecting lens.

Furthermore,, it is preferable to provide a light gathering device which forms a secondary light image of the light source onto the total reflecting mirror. In this case, the optical axis of the projecting lens and the optical axis of the image projection plane extend along the same line.

In accordance with another aspect of the present invention, the optical axis of the projecting lens crosses to the optical axis of the image projection plane in the vicinity of the exit pupil of the projecting lens, and the second portion of the optical path separating device can be comprised of a total reflecting mirror disposed on one side of a diameter of the projecting lens, which mirror reflects reflected light by said mirror towards the image projection plane. The optical axis of the image projection plane is preferably normal to the optical axis of the projecting lens.

In this arrangement, the light gathering device forms a secondary light image of the light source in the vicinity of the exit pupil of the projecting lens.

In an aspect of the present invention, both the optical axis of illuminating light from the light source and the optical axis of the image projection plane cross to the optical axis of the projecting lens in the vicinity of the exit pupil of the projecting lens. The first portion of the optical path separating device is a first total reflecting mirror which is disposed on one side of a diameter of the projecting lens so that the first total reflecting mirror reflects the illuminating light from the light source towards the projecting lens. The second portion of the optical path separating device is a second total reflecting mirror which is disposed on the other side of a diameter of the projecting lens so that the second total reflecting mirror reflects reflected light by the mirror towards the image projection plane.

Preferably, the optical axis of illuminating light from the light source and the optical axis of the image projection plane are normal to the optical axis of the projecting lens. In this embodiment, the light gathering device forms a secondary light image of the light source onto the first total reflecting mirror.

In accordance with another aspect of the present invention, the transmission type image forming device comprises, for example, a liquid crystal cell and a pair of polarizing elements which are located at both sides of the liquid crystal cell. It is preferable to dispose one of the polarizing elements between the optical path separating element and the image projecting screen so that the liquid crystal panel is never affected by the heat which is produced by the polarizing element upon operating.

BRIEF DESCRIPTION OF THE DRAWINGS

The present invention will be described below in detail with reference to the accompanying drawings which show preferred embodiments of the invention, in which:

FIGS. 11 and 12 are developed views of an optical path of an image forming portion of a reflecting illumination projecting device shown in FIG. 9, shown in different states;

FIG. 13 is a conceptual view of a modified embodiment of a polarized light gathering portion shown in FIG. 9;

FIGS. 25 and 26 are developed views of an optical path of an image forming portion of a reflecting illumination projecting device shown in FIG. 24;

FIG. 27 is a conceptual view of an optical path of a reflecting illumination projecting device according to still another aspect of the present invention;

DESCRIPTION OF THE PREFERRED EMBODIMENTS

EMBODIMENT 1

Figure 1:
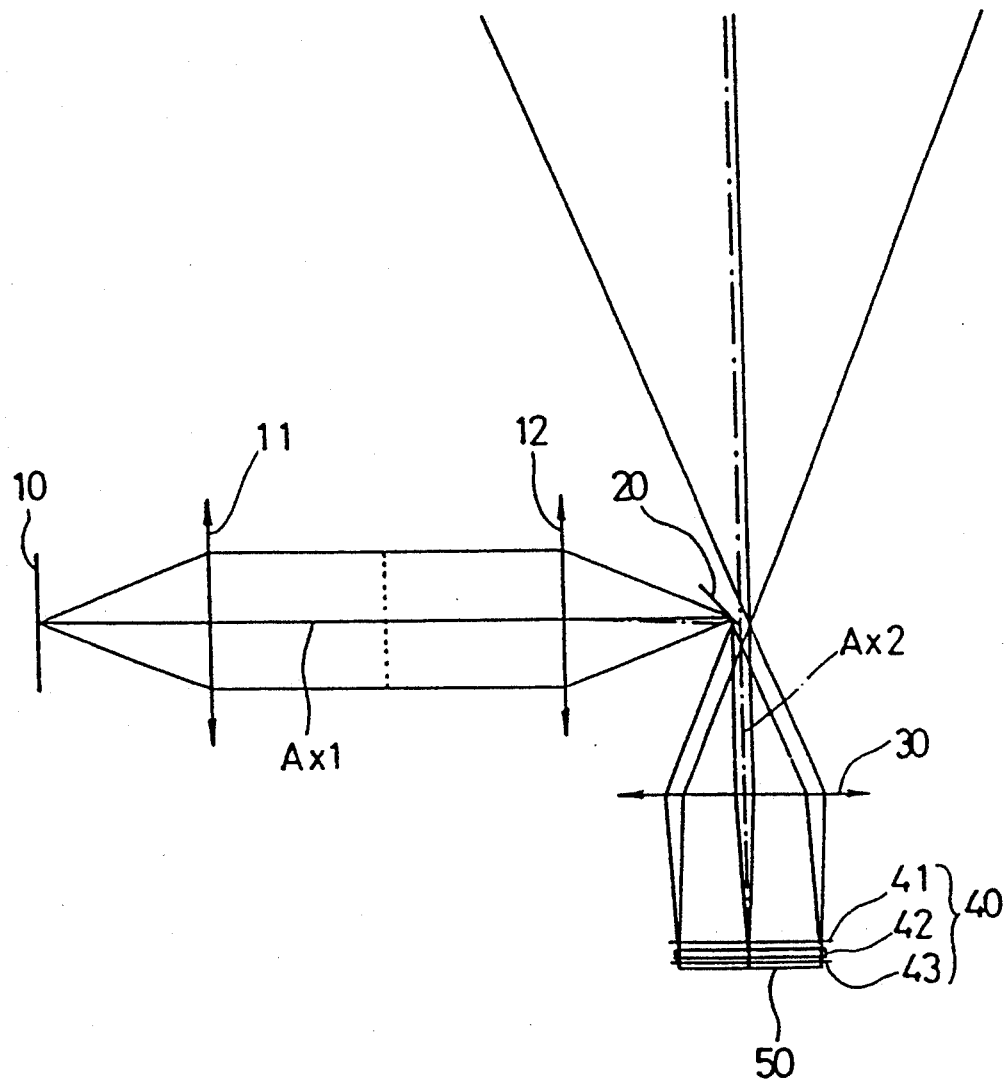
FIG. 1 is a conceptual view of an optical path of a reflecting illumination projecting device according to an aspect of the present invention.
Figure 2:
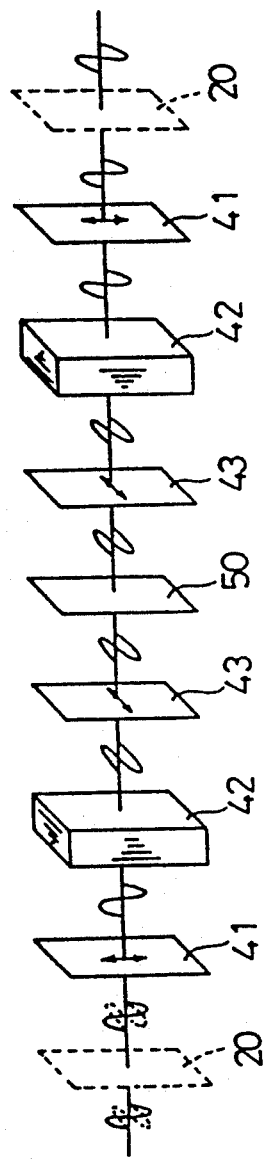
FIGS. 2 and 3 are developed views of an optical path of an image forming device of a reflecting illumination projecting device shown in FIG. 1, shown in different states.
Figure 3:
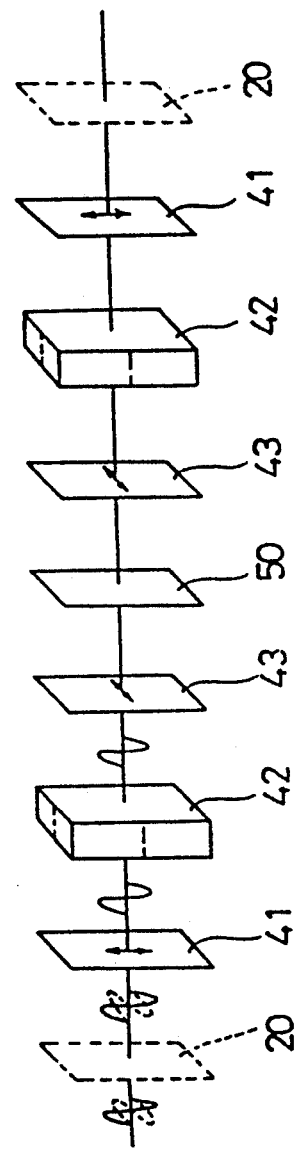

FIGS. 1 through 3 show a first embodiment of the present invention.

A reflecting illumination projecting device which is generically shown in FIG. 1 has a light source 10, a collimating lens 11 which collimates light emitted from the light source 10, a gathering lens (condenser lens) 12 for gathering the collimated beam, a half-size mirror (total reflection mirror) 20 which serves as an optical path separating element located at a focal position of the gathering lens 12, a projecting lens 30 which has an entrance pupil located at the position at which the half-size mirror 20 is located, an image forming portion (device) 40 on which a pattern to be projected is formed, and a reflecting mirror 50 which reflects the beam transmitted through the image forming portion 40 towards the latter.

The optical axis Ax1 of the collimating lens 11 and the gathering lens 12 is normal to the optical axis Ax2 of the projecting lens 30. The half-size mirror 20 is located on a position deviated from the intersecting point of the optical axes Ax1 and Ax2 toward the light source 10, so that substantially all light from the light source 10 is reflected toward the image forming portion 40. Specifically, the half-size mirror 20 is located on the side (left side in FIG. 1) of the optical axis Ax2 adjacent to the light source 10. The collimating lens 11 and the gathering lens 12 form a secondary image of light source 10 on the half-size mirror 20. The projecting lens 30 is a telecentric lens. Note that the term "half-size mirror 20" referred to hereinabove and hereinafter is derived from the location of the mirror on one side of the optical axis Ax2 of the projecting lens 30. In other words, the half-size mirror 20 has a half-size so as not to extend up to the other side of the optical axis Ax2.

The image forming portion 40 has two polarizing plates 41 and 43 having orthogonal transmission axes, and a liquid crystal cell 42 disposed between the polarizing plates 41 and 43. The liquid crystal cell 42 which is made of 90° twisted nematic liquid crystals turns the plane of vibration of the linear polarization incident thereupon by 90° when no voltage is applied to the liquid crystal cell 42. On the other hand, when the liquid crystal cell 42 is supplied with a predetermined value of voltage, the incident linear polarization is transmitted directly therethrough while maintaining the plane of vibration thereof. Consequently, the image forming portion (unit) 40 which is comprised of the liquid crystal cell 42 and the polarizing plates 41 and 43 in combination permits natural light incident thereupon to selectively pass therethrough in accordance with the supply of electrical power to the liquid crystal cell.

The beam transmitted through the image forming unit 40 is reflected by the reflecting mirror 50 and is transmitted again through the image forming unit 40 to be made incident upon the projecting lens 30. Since the half-size mirror 20 is located at the entrance pupil of the projecting lens 30 and the projecting lens 30 is telecentric on the object (image forming unit 40) side, the beam reflected by the mirror 50 passes through the projecting lens 30 only on the side of the optical axis Ax2 thereof on which the half-size mirror 20 is not provided. The beam thus transmitted through the half-size mirror 20 is projected on a screen (not shown) to form an image.

Although the half-size mirror 20 is used as the optical path separating element in the above-mentioned embodiment, it is possible to use a separating plate which wholly covers the optical path of the gathering lens 12 and which has a total reflection portion corresponding to one side of a diameter of the projecting lens 30 and a transmission portion corresponding to the other side of the diameter of the projecting lens 30. For example, the total reflection portion can be made of a mirror or a reflective coating with which the separating plate is coated, and the transmission portion can be made of a transparent glass or the like.

In the case where the projecting lens 30 is not telecentric toward the object side, it is possible to provide a Fresnel lens which serves as a convex lens between the mirror 50 and the image forming unit 40 or to provide a mirror 50 which has a Fresnel lens surface portion to condense the beam, whereby the beam reflected by the mirror 50 can be transmitted through the portion that has no half-size mirror 20 to be projected on the screen.

The following discussion will be directed to the operation of the reflecting illumination projecting device as constructed above, with reference to FIGS. 2 and 3.

In FIG. 2 in which no voltage is applied to the liquid crystal cell 42, a random polarization from the light source is reflected by the half-size mirror 20 and is converted to a linear polarization in the polarizing plate 41. The quantity of the linear polarization is half that of the random polarization from the light source. Since the polarization direction of the linear polarization is turned by 90° when it passes through the liquid crystal cell 42, the linear polarization is directly transmitted through the polarizing plate 43 and is reflected by the mirror 50. The reflected beam is transmitted through the polarizing plate 43 and the liquid crystal cell 42 in which the polarization direction is rotated by 90° to pass through the polarizing plate 41. Thereafter, the beam passes through the side of the projecting lens 30 that has no half-size mirror 20 to reach the screen. The final loss of quantity of the beam is one half (50%) and accordingly the brightness (luminance) of the image formed on the screen is four times that of the prior art mentioned above.

In FIG. 3 in which a predetermined value of voltage is applied to the liquid crystal cell 42, since the linear polarization converted by the polarizing plate 41 is directly transmitted through the liquid crystal cell 42 without changing the polarization direction thereof, the beam is intercepted by the polarizing plate 43, so that no projecting light reaches the screen.

Figure 4:
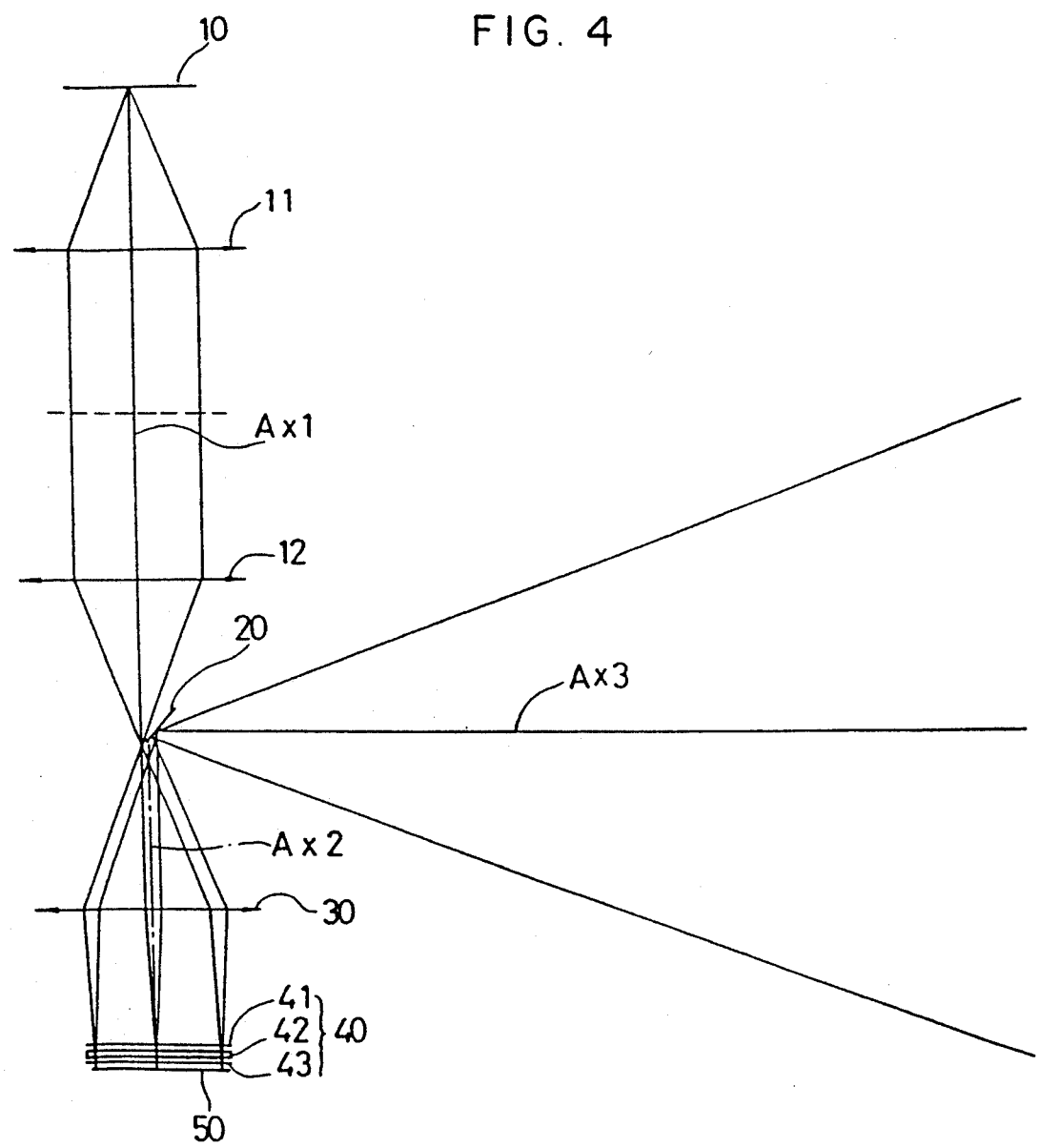
FIG. 4 is a conceptual view of an optical path of an optical path separating element which splits light reflected from an image forming device, according to the present invention.
Figure 5:
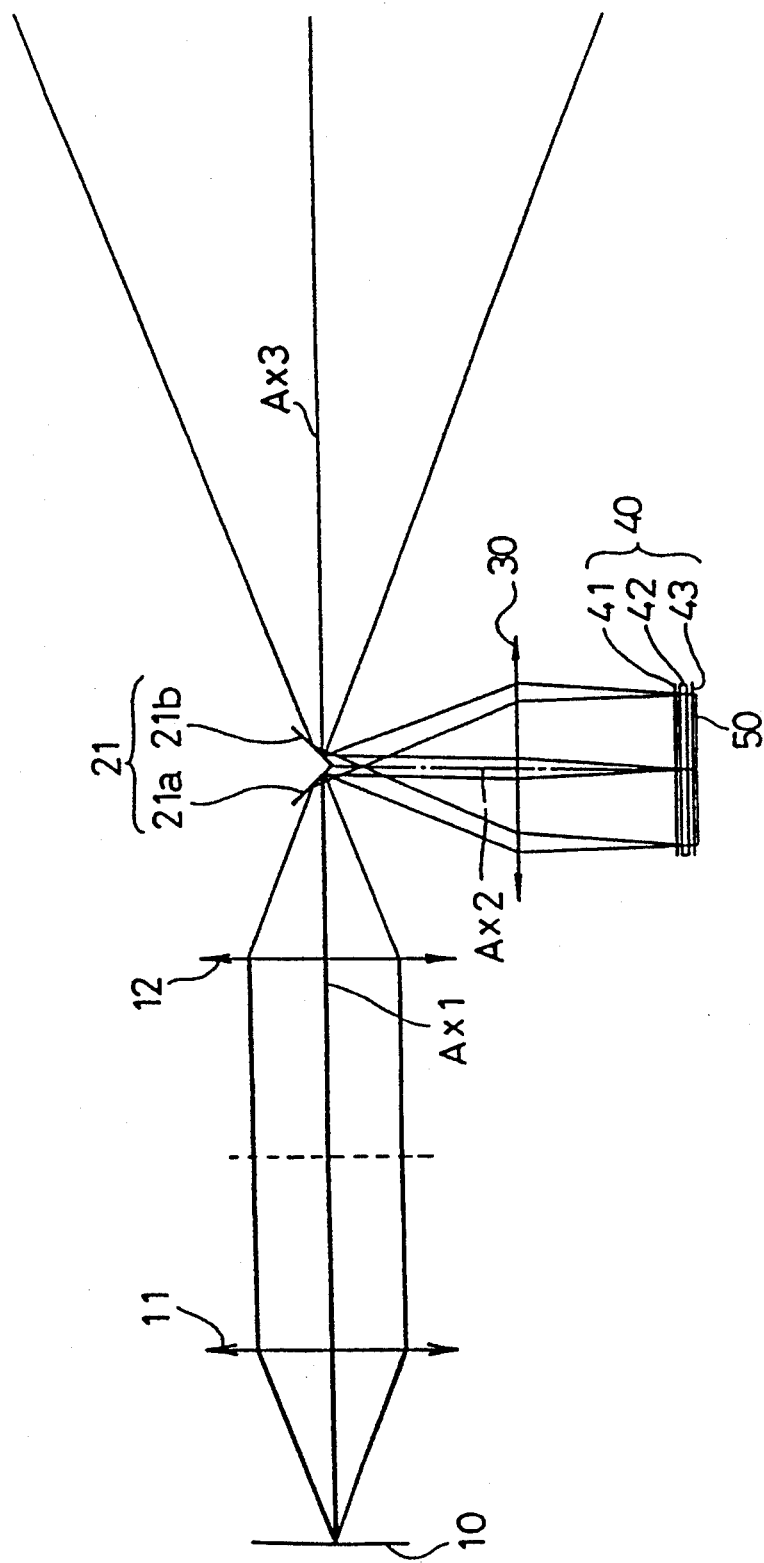
FIG. 5 is a conceptual view of an optical path separating element which is in the form of a roof mirror (Dach mirror), according to the present invention.

FIGS. 4 and 5 show a modified arrangement of the invention.

In FIG. 4, the optical axis Ax3 of the screen is substantially perpendicular to the optical axis Ax2 of the projecting lens 30, and the half-size mirror 20 is provided on only one side of a diameter of the projecting lens 30. The illuminating beam emitted from the light source 10 is transmitted through the side of the projecting lens 30 on which no half-size mirror 20 is provided and is reflected by the image forming unit 40. The reflected beam is reflected by the half-size mirror 20 through the projecting lens 30 to be introduced to the screen.

In FIG. 5, the optical axis Ax1 of the collimating lens 11 and the gathering lens 12 and the optical axis Ax3 of the screen are substantially perpendicular to the optical axis Ax2 of the projecting lens 30. The optical axes Ax1 and Ax3 extend along the same line. The optical path separating element is comprised of a roof mirror 21 which has a first mirror portion 21a which is located on one side of the optical path that is divided by a diameter of the projecting lens 30 and a seocnd mirror portion 21b which is located on the other side of the diameter of the projecting lens 30. The first mirror portion 21a and the second mirror portion 21b are perpendicular to each other.

In an optical arrangement shown in FIG. 5, the illuminating beam emitted from the light source 10 is reflected by the first mirror portion 21a toward the projecting lens 30 and is then reflected by the image forming unit 40. The reflected light from the image forming unit 40 is reflected toward the screen by the second mirror portion 21b.

Although the geometrical (or physical) arrangements of the components shown in FIGS. 4 and 5 are different from that of FIG. 1, the optical arrangements when developed along the optical path are identical to that of FIG. 1

The optical path separating element mentioned above is the type in which the optical path is split into two path portions with respect to the diameter passing the optical axis in the above-mentioned embodiments. Alternatively, the optical path separating element can be modified as follows.

Figure 6:
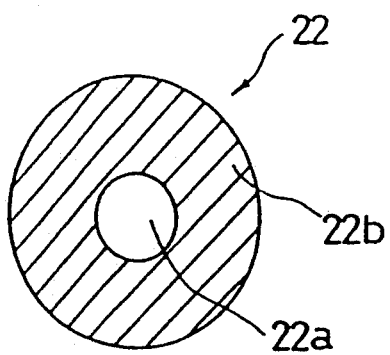
FIG. 6 is a plan view of a ring mirror as an optical path separating element, according to the present invention.

In FIG. 6 which shows a first modification of the optical path separating element, a ring mirror 22 having a central transparent portion 22a and an annular total reflection portion 22b surrounding the central transparent portion 22a is used as an optical path separating element.

Figure 7:
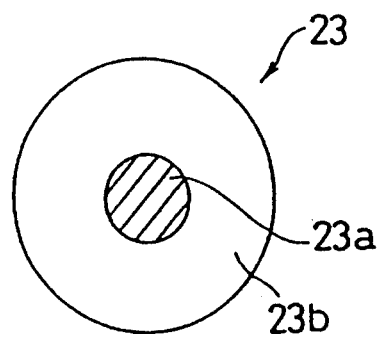
FIG. 7 is a plan view of a circular plate having a central small mirror portion as an optical path separating element, according to the present invention.

In FIG. 7 which shows a second modification, the optical path separating element is constituted by a circular plate 23 having a central small total reflection mirror portion 23a and an annular transparent transmission portion 23b surrounding the central small total reflection mirror portion 23a.

Figure 8:
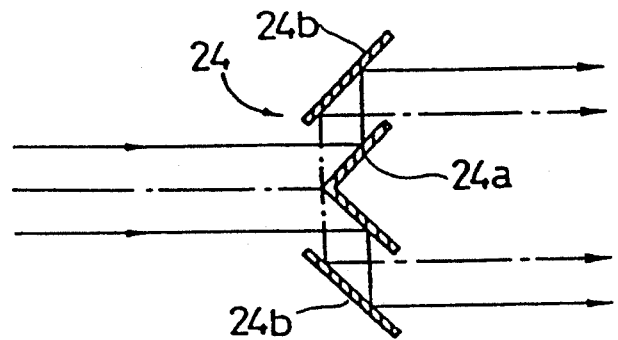
FIG. 8 is an explanatory view of a mirror arrangement for forming an annular light flux, according to the present invention.

If the ring mirror 22 is located, instead of the half-size mirror 20, in the same arrangement as that of FIG. 1, the mirror 22 is inclined in the optical path with respect to the optical axis Ax2 of the projecting lens 30. The illuminating beam is converted to an annular beam by a mirror assembly 24 as shown in FIG. 8 which is arranged between the gathering lens 12 and the mirror 22, so that the total quantity of the illuminating beam is reflected by the total reflection mirror portion 22b toward the image forming unit 40. The reflected beam from the image forming unit is transmitted through the central transmission portion 22a to be made incident upon the screen.

The mirror assembly 24 has a small conical mirror 24a which is provided on its outer peripheral surface with a mirror surface and a larger truncated conical mirror 24b which is provided on its inner peripheral surface with a mirror surface.

If the circular plate (mirror) 23 having the central small mirror 23a, as shown in FIG. 7, is located in the same arrangement as that of FIG. 1, the mirror 23 is inclined in the optical path with respect to the optical axis Ax2 of the projecting lens 30, the same as the mirror 22. The illuminating light is gathered onto the central total reflection mirror portion 23a and is reflected toward the image forming portion 40. The beam transmitted through the image forming portion 40 and reflected by the mirror 50 is transmitted again through the image forming portion 40 and the circumferential transmission portion 23b of the mirror 23 and reaches the screen.

Although the projecting lens is composed of one lens in the above-mentioned embodiment, it is not limited thereto. For instance, it is possible to place an upper objective lens and a lower image forming lens on the opposite sides of the optical path separating element as a projecting lens.

EMBODIMENT 2

FIGS. 9 through 12 show a second embodiment of a reflecting illumination projecting device according to the present invention.

In the first embodiment mentioned above, the quantity of the projecting light is finally reduced by half by the polarizing plate located in front of the liquid crystal cell to create the linear polarization, though the quantity of light is nevertheless four times that in the prior art. The second embodiment, discussed below is accordingly aimed at no loss of the quantity of light upon converting the illuminating light to the linear polarization.

Figure 9:
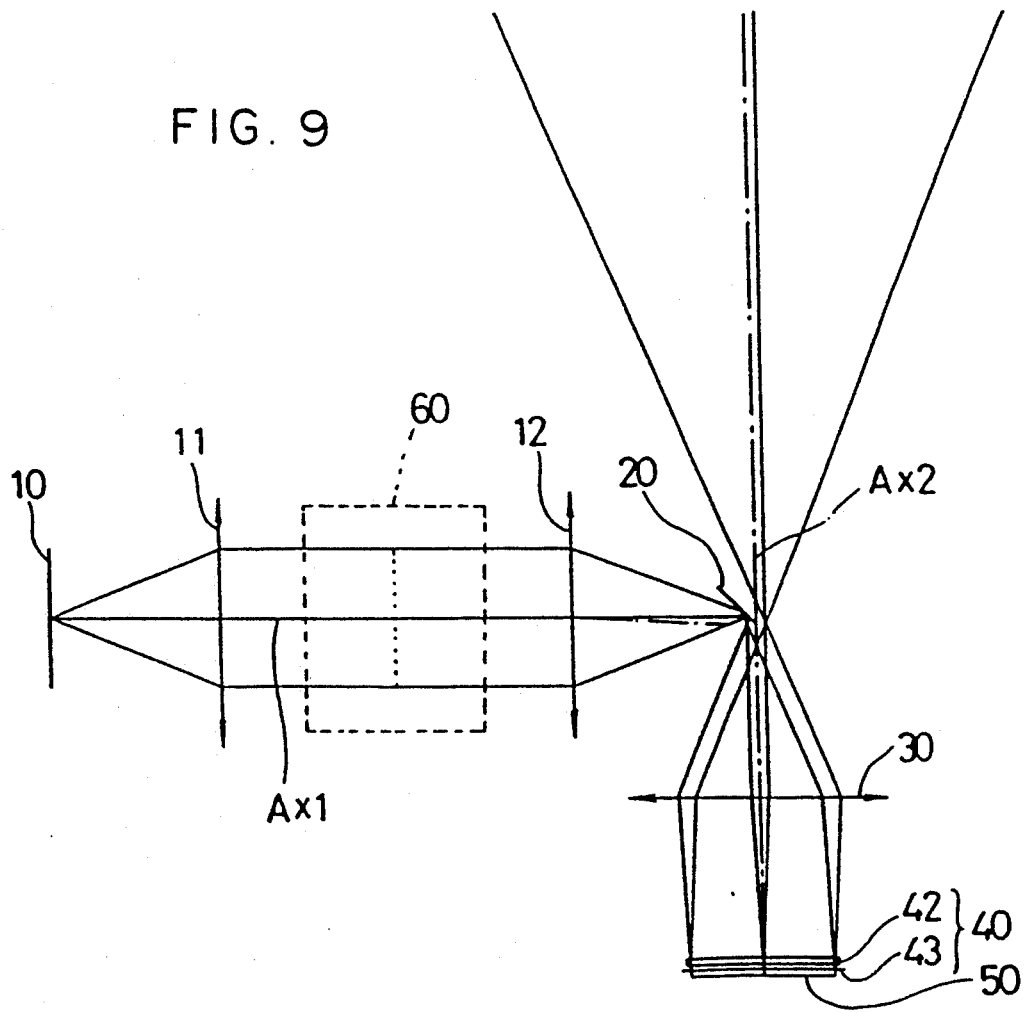
FIG. 9 is a conceptual view of an optical path of a reflecting illumination projecting device according to another aspect of the present invention.

The optical system illustrated in FIG. 9 has a polarized beam collector 60 disposed between the collimating lens 11 and the gathering lens 12. In comparison with the first embodiment illustrated in FIG. 1, the polarizing plate 41 which is located in front of the liquid crystal cell 42 in FIG. 1 is dispensed with, and only the polarizing plate 43 is provided between the liquid crystal cell 42 and the mirror 50, as in the arrangement shown in FIG. 9.

The liquid crystal cell 42 is made of 90° twisted nematic liquid crystals, similar to the first embodiment illustrated in FIG. 1.

Figure 10:
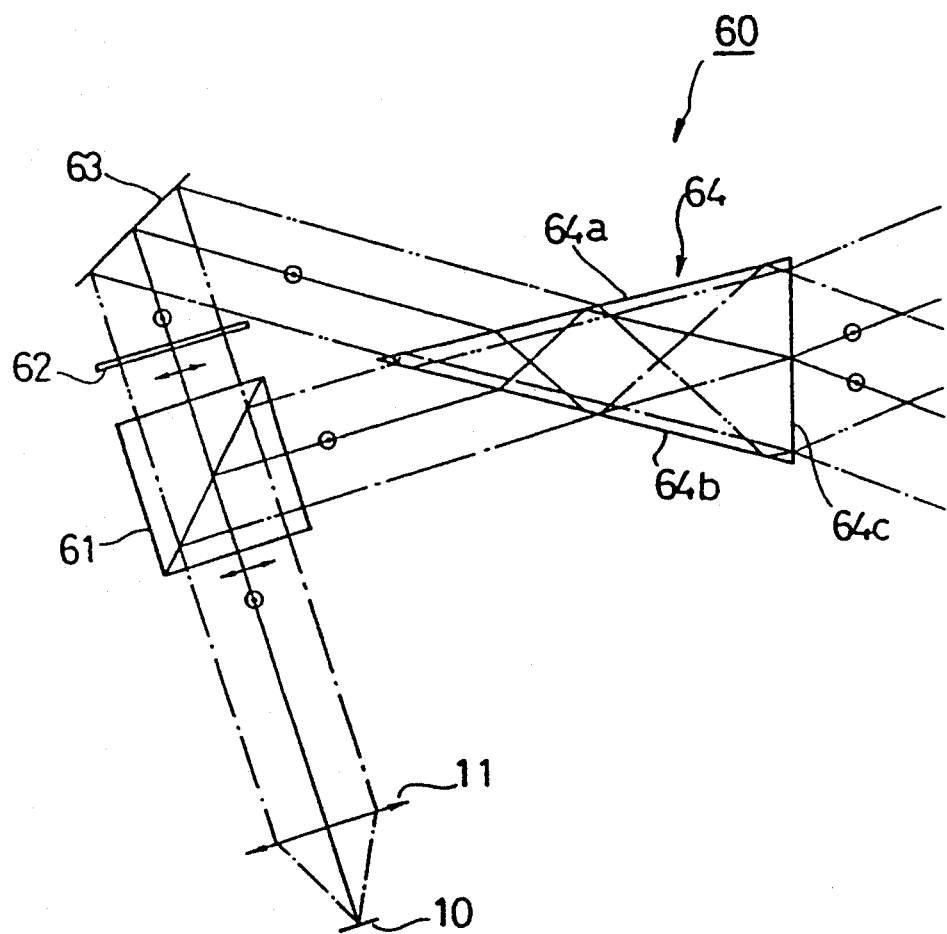
FIG. 10 is a conceptual view of an optical path of a polarized light gathering portion shown in FIG. 9.

The polarized beam collector 60 is, for example, constructed as shown in FIG. 10.

The polarized beam collector 60 shown in FIG. 10 has a polarization beam splitter 61 which splits the beam collimated by the collimating lens 11 into two linear polarization components and a wedge-shape composite prism 64 which gathers the split linear polarization components without using the polarization.

Among the beams of light incident upon the polarization beam splitter 61, the P-polarized light component which has a direction of vibration of the electric field vector parallel with a plane in which the sheet of drawing lies is transmitted through the connecting surface of the two optical elements of the polarization beam splitter 61 and is then made incident upon a λ/2 plate (wave plate) 62, as shown at a two-dotted and dashed line in FIG. 10. When the P-polarized light component is transmitted through the λ/2 plate 62, the direction of vibration thereof is converted to be normal to the plane of the sheet of drawing. The beam is then reflected by the mirror 63 and is made incident upon the wedge-shape prism 64 at the first surface 64a thereof.

The S-polarized light component which has a direction of vibration of the electric field vector normal to the plane of the drawing sheet is reflected by the connecting surface of the two optical elements of the polarization beam splitter 61 and is then made incident upon the wedge-shape prism 64 at the second surface 64b thereof, as shown at a dotted and dashed line in FIG. 10.

With this structure, only a predetermined linear polarization component can be taken and collected from the natural beam having random polarization emitted from the light source.

The reflecting illumination projecting device according to the second embodiment operates as follows (see FIGS. 11 and 12).

The natural light having random polarization emitted from the light source is converted to a predetermined polarization direction of linear polarization component by the polarized beam collector 60 and is then reflected by the half-size mirror 20 to be made incident upon the liquid crystal cell 42. When no voltage is applied to the liquid crystal cell 42, the direction of the linear polarization is is turned by 90°, so that the linear polarization is transmitted through the polarizing plate 43 and is reflected by the mirror 50, as shown in FIG. 11. When the liquid crystal cell 42 is supplied with voltage, since no rotation of the direction of the linear polarization takes place in the liquid crystal cell 42, the beam is intercepted by the polarizing plate 43, so that no light is returned to the projecting lens.

The polarized beam collector 60 can be modified as follows.

In the polarized beam collector 60 using the wedge-shape prism, as mentioned above, the resultant beams of light consisting of two linear polarizations are emitted from the same exit surface 64c of the wedge-shape prism 64 in different directions. Namely, there is an angle between the two polarized beams which are gathered by the polarized beam collector 60 and which go out from the exit surface 64c of the wedge-shape prism 64. This results in an irregularity or nonuniformity in luminance depending on the distance between the exit surface 64c of the wedge-shape prism and a plane to be illuminated. To utilize the incident beams of light with no loss, the projecting lens must have a small F-number, i.e., a large aperture diameter. However, generally speaking, it is practically very difficult to realize such a projecting lens.

To solve the problem of irregularity or nonuniformity in luminance mentioned above, the resultant beams of light are substantially collimated in the modified polarized beam collector 60' shown in FIG. 13. Note that also in the following modifications, the incident beam is split into two linear polarizations by the polarization beam splitter 61, and then, the polarization state of one of the linear polarizations is converted by the λ/2 plate 62, similar to the optical system shown in FIG. 10, and accordingly, no explanation therefor will be given below.

The polarized beam collector 60' shown in FIG. 13 has a composite mirror 67 having an array of triangle pole mirrors 67' which have 120° of apex angle and which are closely located side by side without a gap therebetween. The beam transmitted through the polarization beam splitter 61 is made incident upon the composite mirror 67 through the λ/2 plate 62, as shown at a two-dotted and dashed line in FIG. 13. The beam reflected by the composite mirror 67 is reflected by the mirrors 65 and 66 and is made incident again upon the composite mirror 67 from the opposite side thereof.

Supposing that a plane perpendicular to the bisectors of the triangle pole mirrors 67' is a reference plane S, the inclination angle of the reflecting surfaces of the triangle pole mirrors 67' with respect to the reference surface S is 30°. The beams of light are incident upon the associated reflecting surfaces along the adjacent inclined reflecting surfaces at an incident angle of 30°. Thus, the beams of light are reflected by the associated reflecting surfaces of the triangle pole mirrors 67' in a direction normal to the reference surface S.

Figure 14:
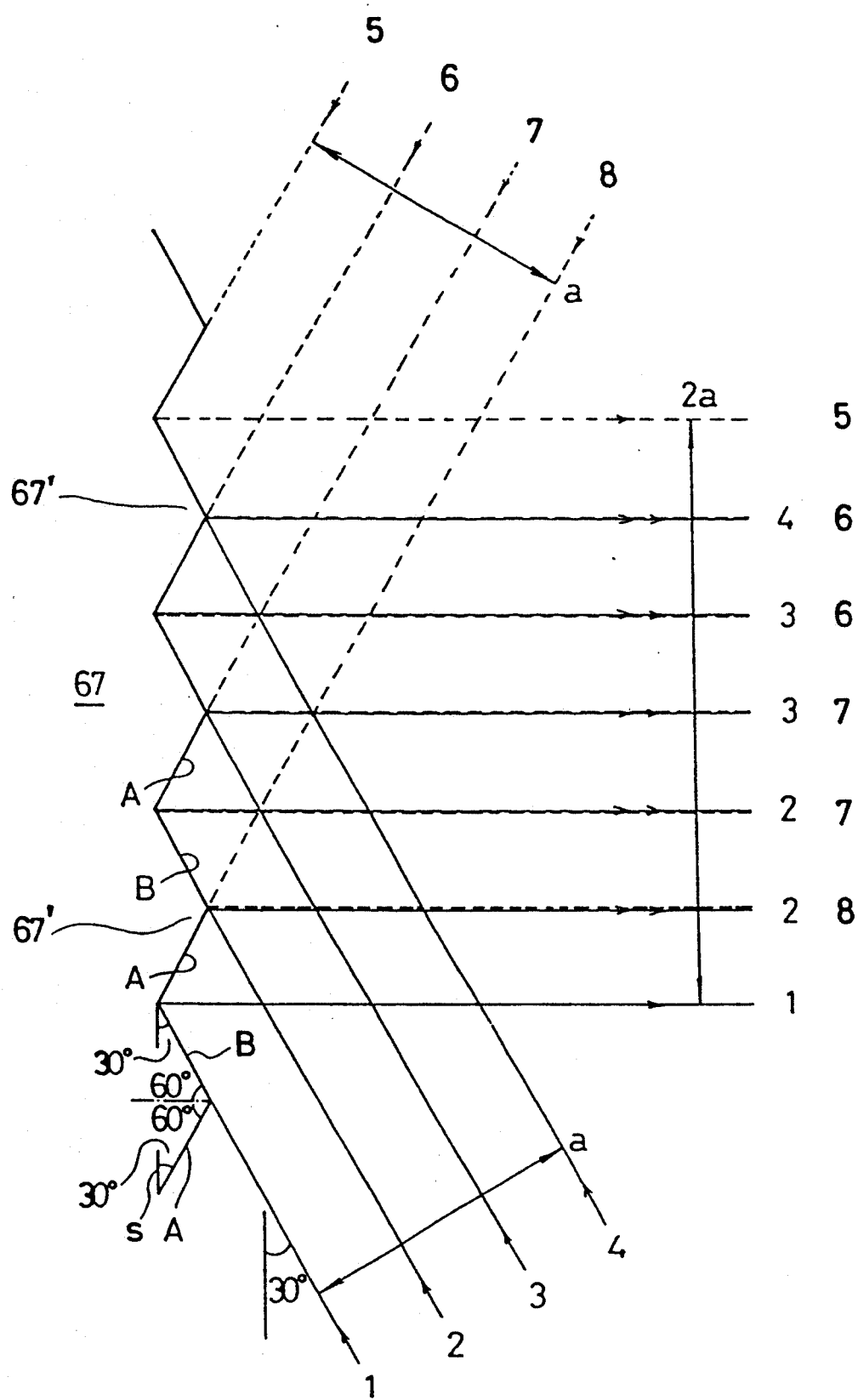
FIG. 14 is a conceptual view of an optical path of a light gathering mirror, according to the present invention.

The inclined reflecting surfaces of the triangle pole mirrors 67' are enlarged in FIG. 14, in which the beams of light from one side are all reflected by the reflecting surfaces A of the triangle pole mirrors 67' in a direction perpendicular to the reference surface S, as shown at solid lines. The beams of light from the other side are also all reflected by the reflecting surfaces B of the triangle pole mirrors 67' in a direction perpendicular to the reference surface S, as shown at phantom lines.

The reflected beams of light from the reflecting surfaces A and B alternately overlap each other, thus resulting in no irregularity or nonuniformity of luminance. Furthermore, the reflected beams of light are emitted in the same direction. Supposing that the respective incident light fluxes have an identical circular shape having a diameter of a, the resultant light flux has an elliptical shape having a major diameter of 2a and a minor diameter of a. It is possible to shape such an elliptical light flux into a circular light flux in accordance with need.

Conversely, it is also possible to positively utilize the elliptical light flux particularly when the image forming portion 40 is rectangular. Namely, taking into account that an image plane, such as TV or a photographic film is usually rectangular, the elliptical light flux can be advantageously used to effectively and uniformly illuminate the whole image plane.

To realize an identical emission direction and a uniform luminance, the inclination angle of the reflecting surfaces A and B is preferably 30°, as mentioned above.

Figure 15:
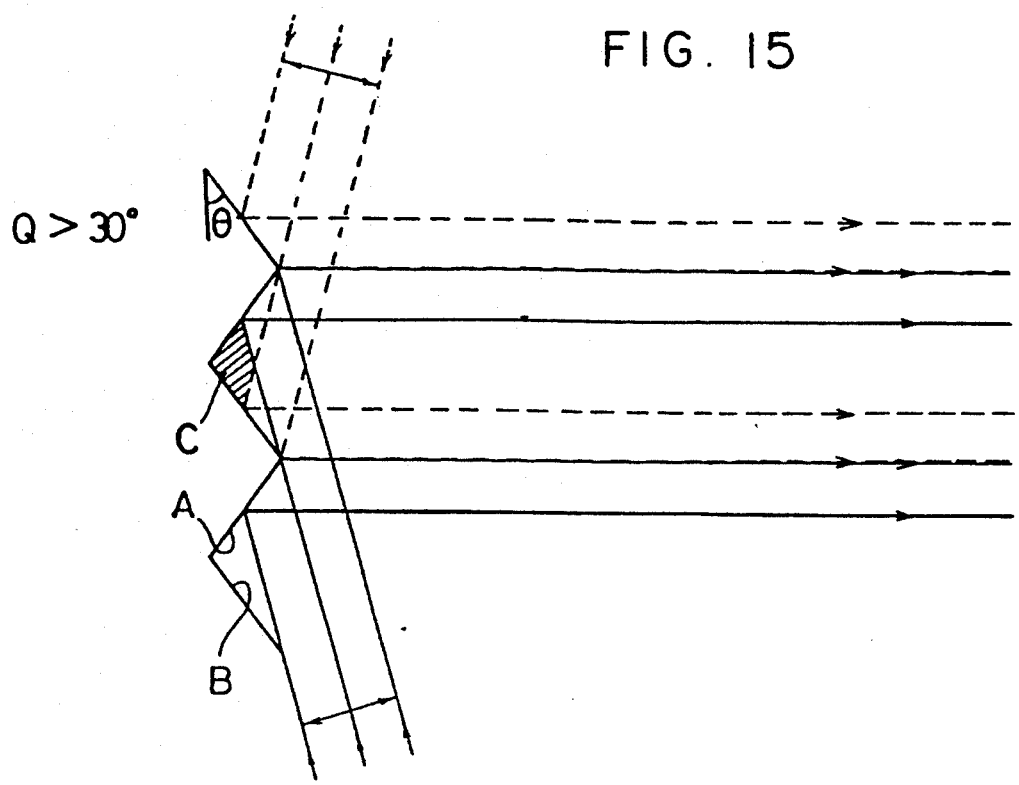
FIGS. 15 and 16 are conceptual views of an optical path of a light gathering mirror shown in different angular positions thereof.

If the inclination angle $\theta$ of the reflecting surfaces A and B with respect to the reference surface S is larger than 30°, it is impossible to use the entire surfaces of the reflecting surfaces to make the emission directions of light identical to each other, as can be seen in FIG. 15. Namely, no beam of light reaches the hatched area C in FIG. 15, thus resulting in irregular or nonuniform luminance. Such an irregular or nonuniform luminance can be improved to some extent by providing different inclination angles of the reflecting surfaces, if the beams of light to be emitted may have emission directions slightly different from each other, as shown in FIG. 10.

Figure 16:
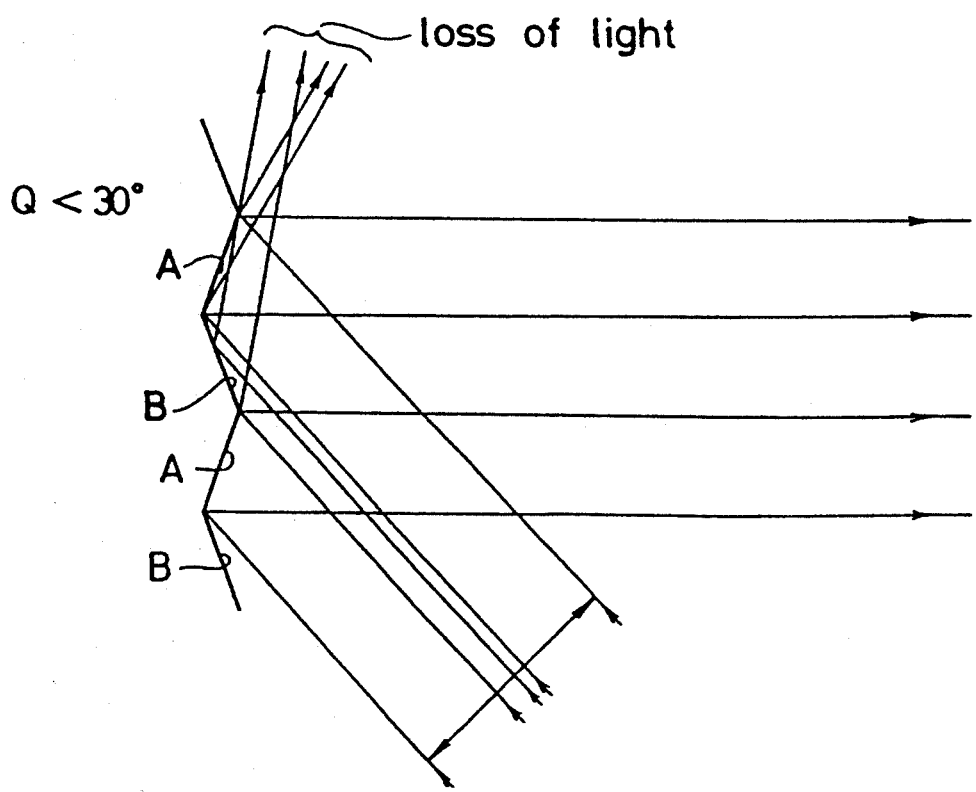

Conversely, if the inclination angle $\theta$ of the reflecting surfaces A and B with respect to the reference surface S is smaller than 30°, no irregularity of luminance occurs, but a part of the beams to be reflected by the reflecting surfaces A is reflected by the reflecting surfaces B, so that the partial beam thus reflected by the reflecting surfaces B is deviated from the optical path, thus resulting in a reduced quantity of light, as shown in FIG. 16.

Figure 17:
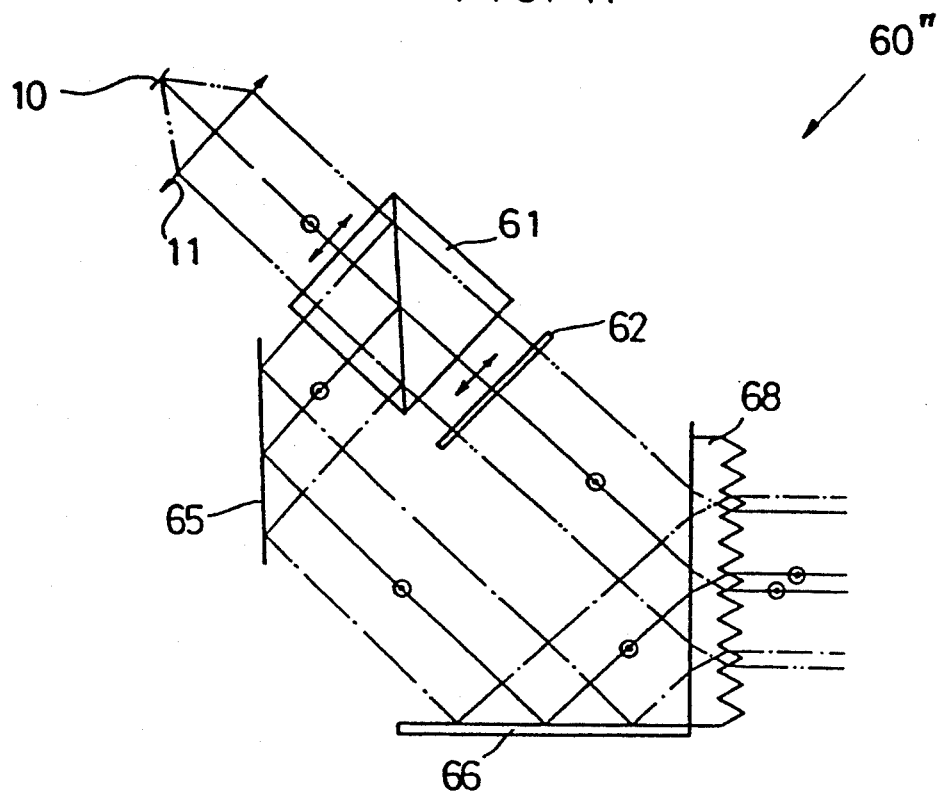
FIG. 17 is a conceptual view of an optical path showing a modification of a polarized light gathering portion, according to the present invention.

FIG. 17 shows another modification of a polarized beam collector 60'', in which a composite prism 68 is used to make the emission directions of the beams having the same polarization direction identical to each other by the refraction rather than the reflection. The composite prism 68 has a flat end surface on the incident side and a serrated end surface consisting of continuous triangle poles located side by side on the emission side. Other construction of the optical system shown in FIG. 17 is similar to that in FIG. 13.

The composite prism 68 shown in FIG. 17 operates as follows (see FIGS. 18-20).

Figure 18:
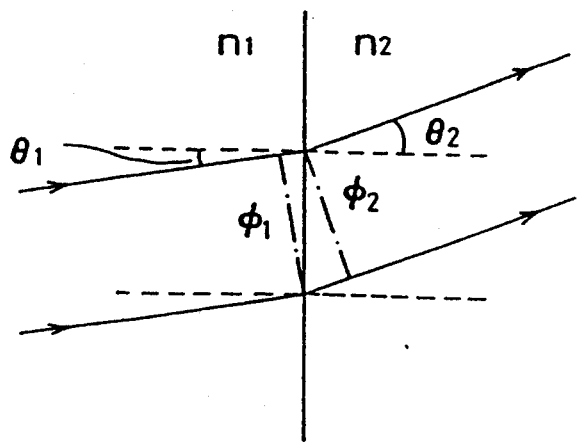
FIGS. 18 through 20 are explanatory views of a composite prism shown in FIG. 17 shown in different positions.

FIG. 18 shows the refraction of the beams at boundary surfaces having different refractive indexes.

Let the refractive indexes of the media on the incident side and the emission side be represented by $n_1$ and $n_2$, respectively, we have:

$$n_1 \cdot \sin \theta_1 = n_2 \cdot \sin \theta_2 \quad (1)$$

wherein $\theta_1$ designates the incident angle, and $\theta_2$ the refraction angle, respectively.

The magnification m of change in beam diameter due to the refraction is expressed by the following relation:

$$\begin{aligned} m &= \phi_2/\phi_1 \\ &= \cos\theta_2/\cos\theta_1 \\ &= [\{1 - (n_1/n_2)^2 \cdot \sin^2\theta_1\}/(1 - \sin^2\theta_1)]^{\frac{1}{2}} \end{aligned} \quad (2)$$

wherein $\phi_1$ designates the beam diameter on the incident side; $\phi_2$ the beam diameter on the emission side, respectively.

To satisfy $m < 1$, $n_1$ must be larger than $n_2$ ($n_1 > n_2$).

Figure 19:
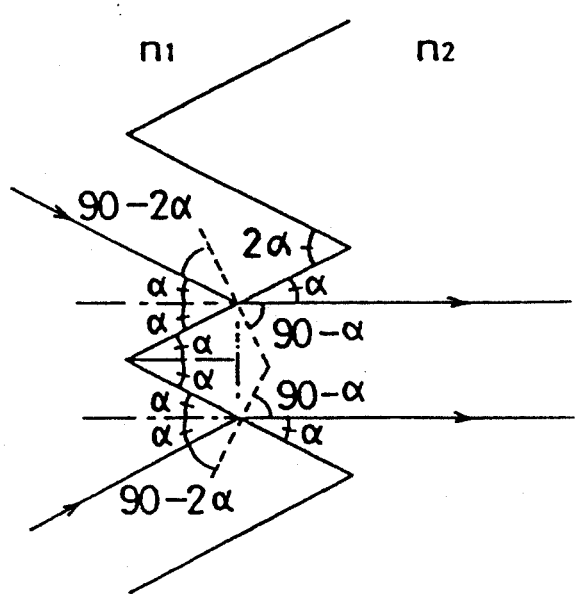

FIG. 19 shows the refraction of the beam at the serrated end surface of the composite prism 68.

If the following relation is satisfied to eliminate the eclipse of the beam;

$$\theta_1 = 90 - 2\alpha, \theta_2 = 90 - \alpha$$

wherein $2\alpha$ is the apex angle of the serration, we have the following equation from equation (1)

$$n_1 \cdot \cos 2\alpha = n_2 \cdot \cos \alpha$$

From this, the following equation (3) is obtained.

$$\cos \alpha = \{1 + [1 + 8(n_1/n_2)^2]^{\frac{1}{2}}\} / \{4 \cdot n_1/n_2\} \quad (3)$$

In this equation, $$m = \cos \theta_2 / \cos \theta_1 = \sin \alpha / \sin 2\alpha = 1/(2 \cos \alpha) \quad (4)$$

Figure 20:
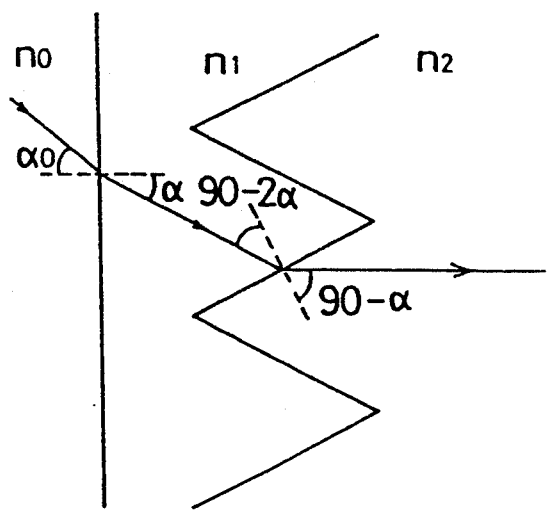

Taking the above analysis into consideration, the operation of the composite prism 20 is shown in FIG. 20.

On the boundary surface on the incident side, the following relation is satisfied;

$$n_0 \cdot \sin \alpha_0 = n_1 \cdot \sin \alpha \quad (5)$$

From equation (2) and (4), the total magnification m' is expressed by $$m' = \{\cos \alpha / \cos \alpha_0\} \cdot \{\frac{1}{2} \cos \alpha\} = \frac{1}{2} \cos \alpha_0 \quad (6)$$

Consequently, if the refractive indexes of the three media are determined, the apex angle $\alpha$ at which no eclipse occurs is obtained from equation (3), and accordingly, the incident angle $\alpha_0$ is determined, based on equation (5). Using the value of $\alpha_0$ thus obtained, the total magnification m' is obtained by equation (6).

For instance, in the case that the media on the opposite sides of the composite prism are air ($n_0 = n_2 = 1$) and the composite prism is made of glass of . Bk7 ($n_1 = 1.51633$), $\alpha = 27.008°$
$\alpha_0 = 43.518°$
$m' = 0.690$ Under these values, all the beams of light emitted from the composite prism 68 have the identical emission direction.

Embodiment 3]

Figure 21:
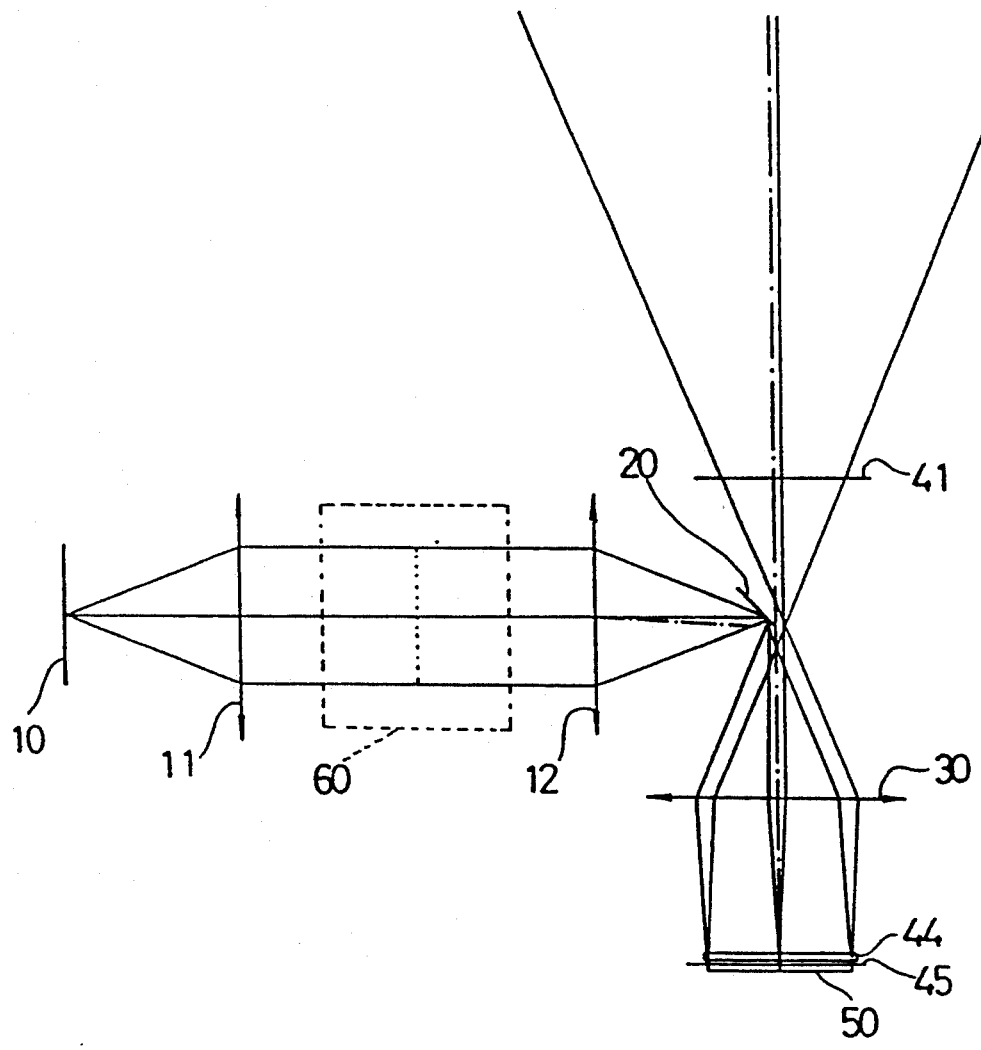
FIG. 21 is a conceptual view of an optical path of a reflecting illumination projecting device according to still another aspect of the present invention.
Figure 22:
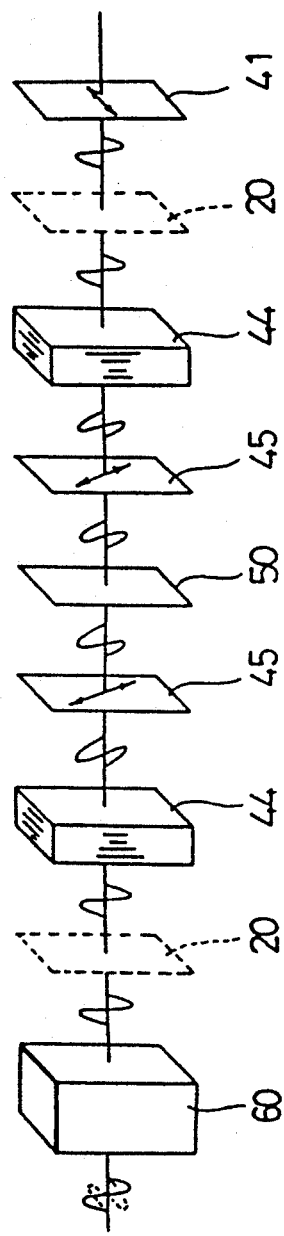
FIGS. 22 and 23 are developed views of an optical path of an image forming device of a reflecting illumination projecting device shown in FIG. 21.
Figure 23:
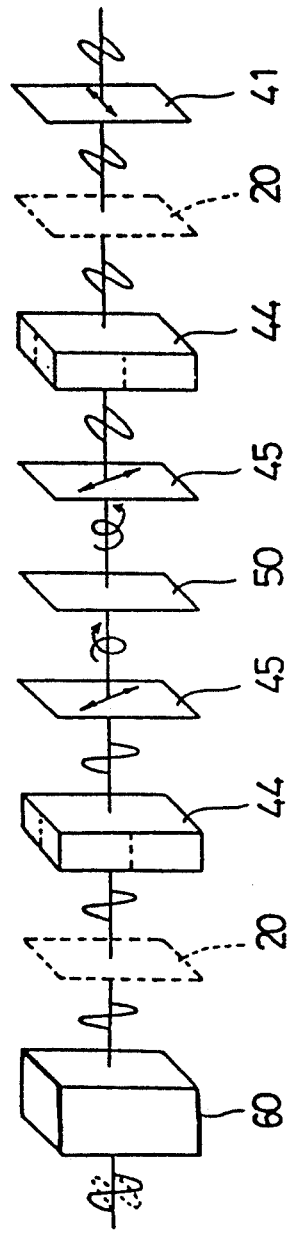

FIGS. 21 through 23 show a third embodiment of a reflecting illumination projecting device according to the present invention.

In the aforementioned embodiments, the polarizing plate which selectively intercepts beams of light is disposed in the vicinity of the liquid crystal cell. However, the polarizing plate generates heat upon quenching, and accordingly, there is a possibility that the heat has an adverse influence on the liquid crystal cell. To eliminate such a possibility, the polarizing plate 41 which selectively quenches light is located between the screen and the projecting lens 30, in the third embodiment illustrated in FIG. 21.

The liquid crystal cell 44 is made of 135° twisted nematic liquid crystals. When no voltage is applied to the liquid crystal cell 44, the linear polarization incident thereupon is rotated by 135° in the liquid crystal cell 44. Conversely, when the voltage is supplied to the liquid crystal cell 44, the incident linear polarization is transmitted therethrough without being rotated. Between the liquid crystal cell 44 and the mirror 50 is provided a $\lambda/4$ plate 45 which makes the polarization direction of the beam emitted from the liquid crystal cell 44 identical to the direction of the crystal axis When no voltage is applied to the liquid crystal cell.

The reflecting illumination projecting device of the third embodiment operates as follows (see FIGS. 22 and 23).

The beam of light having a random polarization emitted from the light source 10 is converted only to a predetermined direction of linear polarization component in the polarized beam collector 60 and is then reflected by the half-size mirror 20 to be made incident upon the liquid crystal cell 44. When no voltage is applied to the liquid crystal cell 44, the polarization direction of the linear polarization is rotated by 135° by the liquid crystal cell to be identical to the crystal axis of the $\lambda/4$ plate 45. Consequently, the linear polarization passes through the $\lambda/4$ plate 45 and is then reflected by the mirror 50. The beam reflected by the mirror 50 is again transmitted through the $\lambda/4$ plate 45. Thereafter, the polarization direction of the beam is rotated by 135° by the liquid crystal cell 44 to be made normal to the transmission axis of the polarizing plate 41 located behind the projecting lens 30, as shown in FIG. 22. As a result, the beam is intercepted by the polarizing plate 41, and accordingly, no projecting light reaches the screen.

When a voltage is applied to the liquid crystal cell 44, since no rotation of the polarization direction of the linear polarization takes place in the liquid crystal cell 44, the linear polarization is converted to a circular polarization by the $\lambda/4$ plate 45. The direction of rotation of the circular polarization is reversed when reflected by the mirror 50, so that when it passes through the $\lambda/4$ plate 45, it becomes a linear polarization perpendicular to the linear polarization before reflection, as shown in FIG. 23. Consequently, the beam passes through the liquid crystal cell 44 and the polarizing plate 41 and is projected onto the screen.

In the reflecting illumination projecting device as constructed above, since the liquid crystal cell 44 is spaced from the polarizing plate 41 (heat generating portion), the liquid crystal cell is substantially not influenced by heat, thus resulting in a reliable operation thereof. Furthermore, since the polarization direction of a ghost light which is reflected from the projecting lens 30 or by the surface of the liquid crystal cell 44 is perpendicular to the polarization direction of the effective light having the necessary image information, the possible ghost light can be certainly removed.

Embodiment 4]

Figure 24:
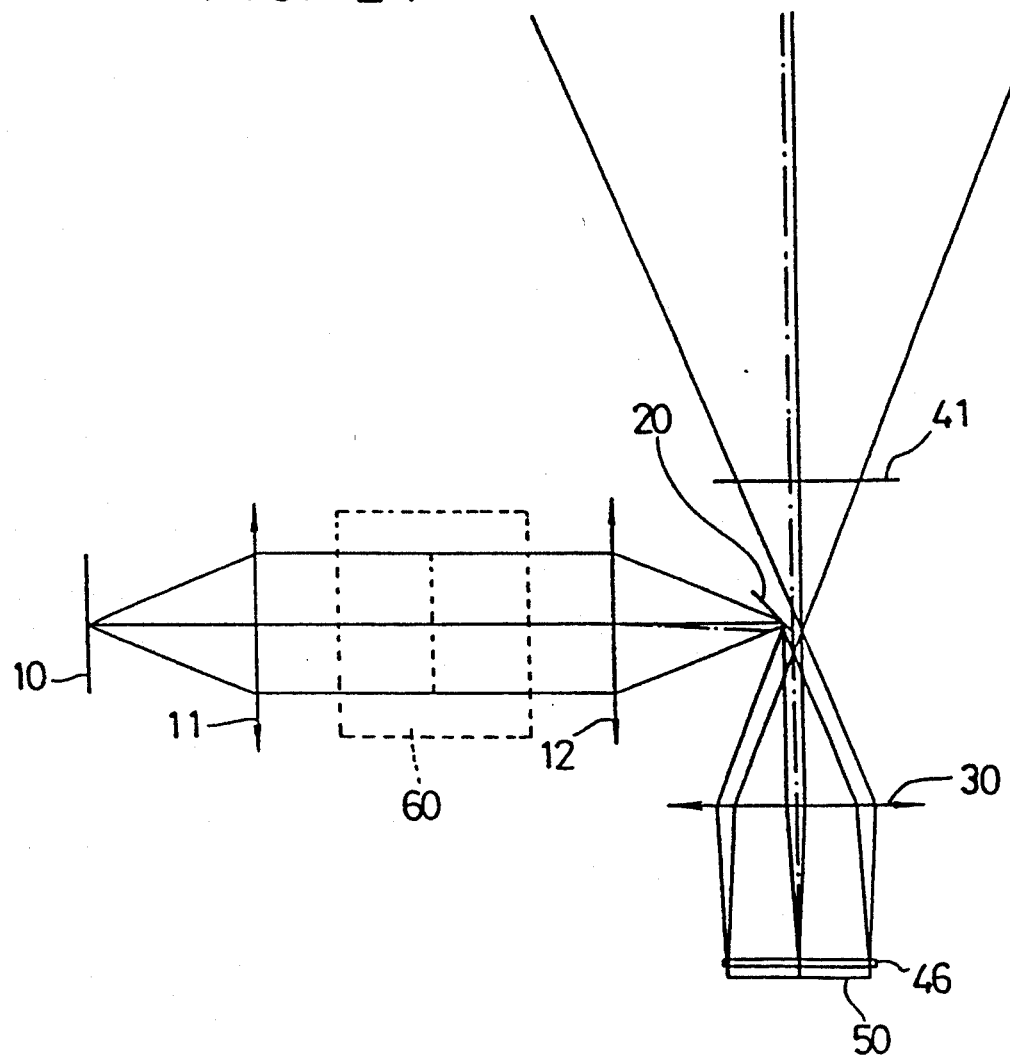
FIG. 24 is a conceptual view of an optical path of a reflecting illumination projecting device according to another aspect of the present invention.
Figure 28:
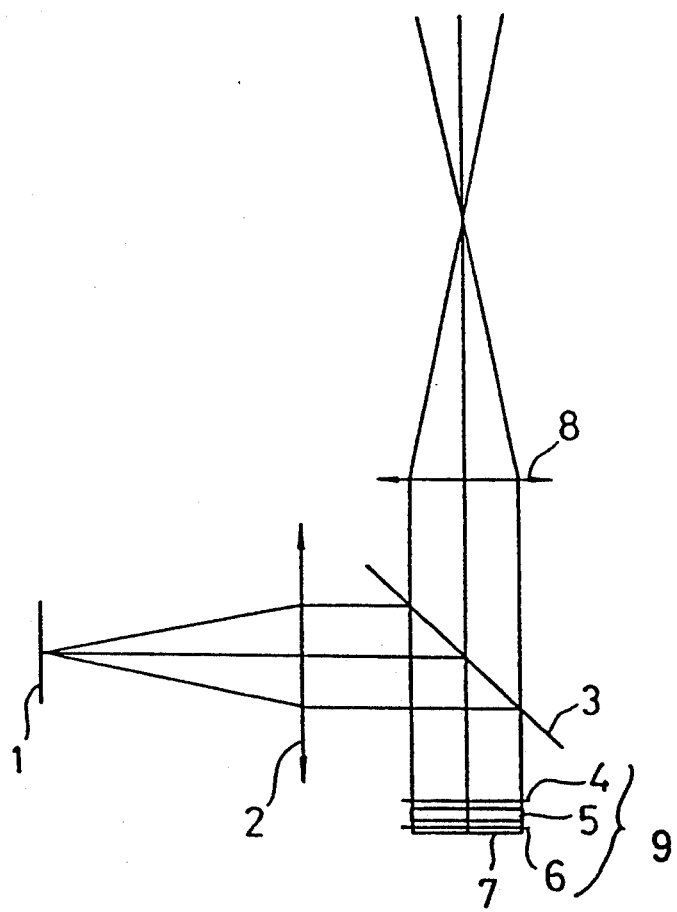
FIG. 28 is a conceptual view of an optical path of a known reflecting illumination projecting device; and, FIGS. 29 and 30 are developed views of an optical path of an image forming device of a known reflecting illumination projecting device shown in FIG. 28.
Figure 29:
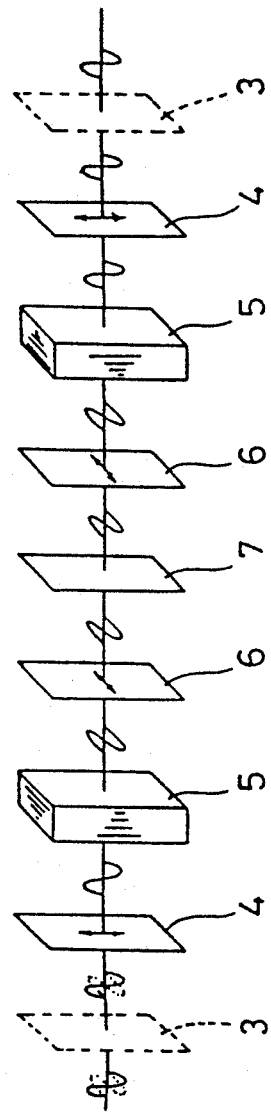
Figure 30:
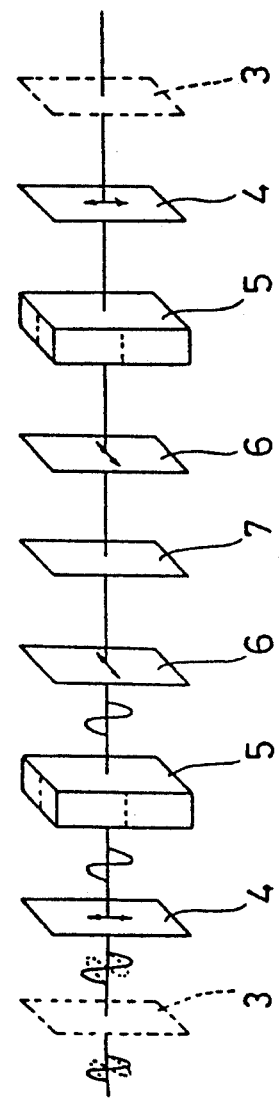

FIGS. 24 through 26 show a fourth embodiment of a reflecting illumination projecting device according to the present invention.

The device also has the quenching polarizing plate 41 which is located closer to the screen with respect to the projecting lens 30. There is no optical element between the liquid crystal cell 46 and the mirror 50. The liquid crystal cell 46 is made of nematic crystals in the homeotropic arrangement, so that when no voltage is applied thereto, the linear polarization incident thereupon is converted to the elliptical polarization.

The following discussion will be directed to the operation of the reflecting illumination projecting device as constructed above, according to the fourth embodiment of the invention, with reference to FIGS. 25 and 26.

The beam having a random polarization, emitted from the light source 10 is converted only to a predetermined direction of the linear polarization by the polarized beam collector 60 and is reflected by the half-size mirror 20 to be made incident upon the liquid crystal cell 46. When no voltage is supplied to the liquid crystal cell 46, the linear polarization is converted to an elliptical polarization, as shown in FIG. 25. The elliptical polarization is reflected by the mirror 50, so that it becomes an elliptical polarization having the rotation direction opposite to that of the elliptical polarization before reflection. The elliptical polarization is transmitted through the liquid crystal cell 46, so that it becomes a linear polarization perpendicular to the incident linear polarization and is transmitted through the polarizing plate 41 to be made incident upon the screen.

When the liquid crystal cell 46 is supplied with a voltage, the linear polarization passes directly through the liquid crystal cell 46 and is reflected by the mirror 50. Thereafter, the linear polarization is made incident on the polarizing plate 41. However, since the polarization direction of the linear polarization is perpendicular to the transmission axis of the polarizing plate, the linear polarization is intercepted thereby, so that no beam reaches the screen, as shown in FIG. 26.

In the reflecting illumination projecting device of the fourth embodiment mentioned above, the liquid crystal cell is free from the possible influence by heat and a possible ghost light is removed, similar to the third embodiment. In addition, no λ/4 plate is necessary in the fourth embodiment.

Embodiment 5]

FIG. 27 shows a fifth embodiment of a reflecting illumination projecting device according to the present invention.

In FIG. 27, there are three image forming portions. A cross dichroic prism 80 is provided between the projecting lens 30 and the image forming portion 40a. The cross dichroic prism 80 has a first connecting surface 81 which serves as a dichroic mirror surface for reflecting a red component and a second connecting surface 82 which serves as a dichroic mirror surface for reflecting a blue component. The image forming portion 40a forms a pattern corresponding to a green component. The image forming portions 40b and 40c form patterns corresponding to a red component and a blue component, respectively.

With this arrangement, a color image can be formed by three colors of red(R), green (G) and blue (B).

The basic operation of the reflecting illumination projecting device according to the fifth embodiment is similar to the above-mentioned embodiments.

In the fifth embodiment, although each image forming portion is made of one element, the image forming portion can be appropriately combined with the polarizing plate and the polarized beam collector, similar to the aforementioned embodiments.

Although the liquid crystal display is used as the image forming portion in the above-mentioned embodiments, it is possible to use a transmission pattern, such as a liquid crystal light bulb or a photosensitive film, particularly in case where a still image is projected. Similarly, the image projecting plane is not limited to a screen, but can be a photosensitive member.

As can be understood from the above discussion, in the reflecting illumination projecting device according to the present invention, the loss of the quantity of light is minimized by the optical path separating element, thus resulting in an increased contrast of an image formed on a screen.

Furthermore, a further increase of the contrast of an image and the quantity of light to be used to form an image can be achieved by the polarized beam collector.

We claim:

1. A reflecting illumination projecting device comprising:

a light source which emits illuminating light, a mirror which reflects the illuminating light emitted from the light source, a transmission type image forming device which is provided between said light source and said mirror to form a pattern to be projected, a projecting lens which is provided between said light source and said image forming device to project an image of said transmission type image forming device onto an image projection plane, and, an optical path separating means disposed in the vicinity of an exit pupil of said projecting lens, said optical path separating means comprising a first portion for introducing substantially all illuminating light to said projecting lens and a second portion for introducing reflected light from said mirror onto the image projection plane, wherein an optical axis of said projecting lens crosses an optical axis of the image projection plane in the vicinity of said exit pupil of the projecting lens, and said second portion of said optical path separating means is a total reflecting mirror disposed on one side of a diameter of the projecting lens, said total reflecting mirror reflecting reflected light by said mirror towards said image projection plane.

2. A reflecting illumination projecting device according to claim 1, wherein the optical axis of image projection plane is normal to the optical axis of said projecting lens.

3. A reflecting illumination projecting device according to claim 2, wherein an optical axis of the illuminating light and an optical axis of said projecting lens extend along the same line.

4. A reflecting illumination projecting device according to claim 3, further comprising a light gathering means which forms a secondary light image of said light source in said vicinity of the exit pupil of said projecting lens.

5. A reflecting illumination projecting device comprising:

a light source which emits illuminating light, a mirror which reflects the illuminating light emitted from the light source, a transmission type image forming device which is provided between said light source and said mirror to form a pattern to be projected, said mirror located adjacent said transmission type image forming device, such that said transmission type image forming device is provided between said light source and said mirror, said mirror reflecting substantially all light incident thereon, a projecting lens which is provided between said light source and said image forming device to project an image of said transmission type image forming device onto an image projection plane, and, an optical path separating means disposed in the vicinity of an exit pupil of said projecting lens, said optical path separating means comprising a first portion for introducing substantially all illuminating light to said projecting lens and a second portion for introducing reflected light from said mirror onto the image projection plane, wherein an optical axis of illuminating light from said light source and an optical axis of said image projection plane cross to an optical axis of said projecting lens in the vicinity of said exit pupil of said projecting lens, said first portion of said optical path separating means is a first total reflecting mirror which is disposed on one side of a diameter of said projecting lens so that said first total reflecting mirror reflects the illuminating light from said light source towards said projecting lens, and said second portion of said optical path separating means is a second total reflecting mirror which is disposed on the other side of a diameter of said projecting lens, said second total reflecting mirror reflects reflected light by said mirror towards said image projection plane.

6. A reflecting illumination projecting device according to claim 5, wherein the optical axis of illuminating light from said light source and the optical axis of said image projection plane are normal to the optical axis of said projecting lens, respectively.

7. A reflecting illumination projecting device according to claim 6, further comprising a light gathering means which forms a secondary light image of said light source onto said first total reflecting mirror.

8. A reflecting illumination projecting device comprising:
   a light source which emits illuminating light,
   a mirror which reflects the illuminating light emitted from the light source,
   a transmission type image forming device which is provided between said light source and said mirror to form a pattern to be projected,
   a projecting lens which is provided between said light source and said image forming device to project an image of said transmission type image forming device onto an image projection plane, and,
   an optical path separating means disposed in the vicinity of an exit pupil of said projecting lens, said optical path separating means comprising a first portion for introducing substantially all illumination light to said projecting lens and a second portion for introducing reflected light from said mirror onto the image projection plane, wherein said optical path separating means is a circular plate having a central total reflection mirror as said first portion of said optical path separating means and an annular light passing portion surrounding said central total reflection mirror as said second portion of said optical path separating means.

9. A reflecting illumination projecting device according to claim 8, wherein said central total reflection portion reflects the illuminating light of the light source towards the projecting lens, and said annular light passing portion transmits reflected light by said mirror towards said image projecting plane therethrough.

10. A reflecting illumination projecting device comprising:
   a light source which emits illuminating light,
   a mirror which reflects the illuminating light emitted from the light source,
   a transmission type image forming device which is provided between said light source and said mirror to form a pattern to be projected,
   said mirror located adjacent said transmission type image forming device, such that said transmission type image forming device is provided between said light source and said mirror, said mirror reflecting substantially all light incident thereon,
   a projecting lens which is provided between said light source and said image forming device to project an image of said transmission type image forming device onto an image projection plane,
   an optical path separating means disposed in the vicinity of an exit pupil of said projecting lens, said optical path separating means comprising a first portion for introducing substantially all illuminating light to said projecting lens and a second portion for introducing reflected light from said mirror onto the image projection plane,
   means for collimating the illuminating light emitted from said light source, said means for collimating located between said light source and said mirror,
   means for condensing a collimated beam which is formed after passing through said means for collimating the illuminating light emitted from said light source, and
   a polarized beam collector located between said means for collimating and said means for condensing.

11. A reflecting illumination projecting device comprising:
   a light source which emits illuminating light,
   a mirror which reflects the illuminating light emitted from the light source,
   a transmission type image forming device which is provided between said light source and said mirror to form a pattern to be projected,
   said mirror located adjacent said transmission type image forming device, such that said transmission type image forming device is provided between said light source and said mirror, said mirror reflecting substantially all light incident thereon,
   a projecting lens which is provided between said light source and said image forming device to project an image of said transmission type image forming device onto an image projection plane,
   an optical path separating means disposed in the vicinity of an exit pupil of said projecting lens, said optical path separating means comprising a first portion for introducing substantially all illuminating light to said projecting lens and a second portion for introducing reflected light from said mirror onto the image projection plane, and
   means for polarizing provided between said projecting lens and the image projection plane.

12. A reflecting illumination projecting device comprising:
   a light source which emits illuminating light;
   a mirror which reflects the illuminating light emitted from said light source, said mirror reflecting substantially all light incident thereon;
   a transmission type image forming device which is located between said light source and said mirror to form a pattern to be projected;
   a projecting lens which projects an image of said transmission type image forming device onto an image projection plane;

an optical path separating means disposed in the vicinity of an exit pupil of said projecting lens to introduce the illuminating light on said projecting lens on one side of a diameter of said projecting lens and to introduce the light reflected by said mirror onto said image projection plane on the other side of the diameter of said projecting lens, and a polarized beam collector provided between said light source and said optical path separating means.

13. A reflecting illumination projecting device according to claim 12, further comprising:

means for polarizing provided between said projecting lens and the image projection plane.

14. A projecting device comprising:

a light source which emits illuminating light, a transmission type image forming device forming a pattern to be projected, a projecting lens which projects an image of said transmission type image forming device onto an image projection plane, an optical path separating means disposed in the vicinity of an exit pupil of said projecting lens to introduce the illuminating light on said projecting lens on one side of a diameter of said projecting lens and to introduce the pattern projected by said transmission type image forming device onto said image projection plane on the other side of the diameter of said projecting lens; and a polarized beam collector provided between said light source and said optical path separating means.

15. A reflecting illumination projecting device according to claim 14, further comprising:

means for polarizing provided between said projecting lens and the image projection plane.

* * * * *

UNITED STATES PATENT AND TRADEMARK OFFICE
CERTIFICATE OF CORRECTION

PATENT NO. : 5,231,433
DATED : July 27, 1993
INVENTOR(S) : K. YOSHIDA et al.

It is certified that error appears in the above-indentified patent and that said Letters Patent is hereby corrected as shown below:

On the title page section [56], under "FOREIGN PATENT DOCUMENTS", please add the following items:

| Document No. | Date   | Country |
|--------------|--------|---------|
| ---64-9426   | 1/1989 | JAPAN   |
| 64-91116     | 4/1989 | JAPAN   |
| 1197737      | 8/1989 | JAPAN   |
| 1202709      | 8/1989 | JAPAN---. |

Signed and Sealed this

Fourth Day of October, 1994

Attest:

BRUCE LEHMAN

*Attesting Officer*  *Commissioner of Patents and Trademarks*